(12) United States Patent
Hilton et al.

(10) Patent No.: US 12,374,090 B2
(45) Date of Patent: Jul. 29, 2025

(54) METHOD OF DATA COLLECTION FOR PARTIALLY IDENTIFIED CONSUMER PACKAGED GOODS

(71) Applicant: Pensa Systems, Inc., Austin, TX (US)

(72) Inventors: Greg Stuart Hilton, Austin, TX (US); Joel William Iventosch, Austin, TX (US); Catherine Ann Malloy, Austin, TX (US); Michael John Pav, Saint Petersburg, FL (US)

(73) Assignee: Pensa Systems, Inc., Austin, TX (US)

( * ) Notice: Subject to any disclaimer, the term of this patent is extended or adjusted under 35 U.S.C. 154(b) by 375 days.

(21) Appl. No.: 18/096,011

(22) Filed: Jan. 11, 2023

(65) Prior Publication Data

US 2023/0222779 A1  Jul. 13, 2023

Related U.S. Application Data

(60) Provisional application No. 63/298,606, filed on Jan. 11, 2022.

(51) Int. Cl.
| | |
|---|---|
| *G06V 10/778* | (2022.01) |
| *G06V 10/776* | (2022.01) |
| *G06V 10/82* | (2022.01) |
| *G06V 20/60* | (2022.01) |

(52) U.S. Cl.
CPC ........ *G06V 10/7788* (2022.01); *G06V 10/776* (2022.01); *G06V 10/82* (2022.01); *G06V 20/60* (2022.01)

(58) Field of Classification Search
None
See application file for complete search history.

(56) References Cited

U.S. PATENT DOCUMENTS

| | | | |
|---|---|---|---|
| 11,042,840 B2* | 6/2021 | Zohar | G06Q 10/0875 |
| 11,481,751 B1* | 10/2022 | Chaubard | G06V 10/82 |
| 12,204,828 B2* | 1/2025 | Cheshire | G06F 30/12 |
| 2009/0321511 A1* | 12/2009 | Browne | H01M 10/54 |
| | | | 705/308 |
| 2010/0042558 A1* | 2/2010 | Van Beek | G06Q 99/00 |
| | | | 705/500 |
| 2011/0137747 A1* | 6/2011 | Sapin Bodeman | |
| | | | G06Q 30/0611 |
| | | | 705/26.4 |
| 2016/0217509 A1* | 7/2016 | Eggleston, IV | G06Q 30/0283 |

(Continued)

*Primary Examiner* — Anand P Bhatnagar
(74) *Attorney, Agent, or Firm* — John A. Fortkort; Fortkort & Houston PC

(57) ABSTRACT

A method is provided for identifying consumer packaged goods (CPGs). The method includes providing to a machine learning classifier a set of images containing at least one CPG; receiving from the machine learning classifier an indication that the machine learning classifier cannot reliably identify a designated CPG in the set of images; determining whether the designated CPG is a product in a product catalog; if the designated CPG is in the product catalog, then associating the designated CPG with a Global Trade Item Number (GTIN); and if the designated product is not in the product catalog, then designating the CPG as a potentially new product. Notably, this approach allows partially identified products to be treated as full-fledged members of the product catalog, thus allowing data to be collected on these products even before they have been fully identified and their GTINs have been resolved.

20 Claims, 3 Drawing Sheets

(56) References Cited

U.S. PATENT DOCUMENTS

| | | | | |
|---|---|---|---|---|
| 2018/0342317 A1* | 11/2018 | Skirble | ............ | G06K 19/06037 |
| 2021/0365687 A1* | 11/2021 | Starson | ................ | G06V 30/412 |
| 2022/0035970 A1* | 2/2022 | Cheshire | ................ | G06F 30/23 |
| 2024/0020333 A1* | 1/2024 | Krishnamurthy | .... | G06V 10/467 |
| 2024/0202282 A1* | 6/2024 | Larson | ................... | G06V 20/52 |

* cited by examiner

METHOD OF DATA COLLECTION FOR PARTIALLY IDENTIFIED CONSUMER PACKAGED GOODS

CROSS-REFERENCE TO RELATED APPLICATION

This application claims the benefit of priority from U.S. Provisional Patent Application No. 63/298,606, which was filed on Jan. 11, 2022, which has the same title and inventors, and which is incorporated herein by reference in its entirety.

FIELD OF THE DISCLOSURE

The present application relates generally to retail shelf condition metrics, and more specifically to out-of-stock estimation of Consumer Packaged Goods (CPGs).

BACKGROUND OF THE DISCLOSURE

Establishments that buy and sell merchandise that consumers use up and replace on a frequent basis, known in the industry as Consumer Packaged Goods or CPGs, are an important part of the economy. Typically, these establishments employ sophisticated automation to track what comes in (supply chain management systems) and goes out (point of sale systems) but have little visibility into what happens to the products in between. However, visibility into on-the-shelf product availability is vitally important, both for in-person and online shoppers.

Recent advances in artificial intelligence, notably the use of artificial neural networks to recognize objects from camera images, make it possible to survey and count inventory and track its movement in a completely automated and objective way. The advent of deep convolutional neural networks (CNNs) as a mechanism for recognizing individual objects within an image or image stream (video) has revolutionized the field (A. Krizhevsky, I. Sutskever, and G. E. Hinton. Imagenet classification with deep convolutional neural networks. In Advances in neural information processing systems, pages 1097-1105, 2012).

Important metrics for retail shelf data include On Shelf Availability (OSA) and Share of Shelf (SoS). OSA measures the percentage of products that are actually available for purchase versus the number that are expected to be available for purchase, SoS measures the percentage of shelf space allocated to each product or brand.

Computing these metrics for a given retail shelf area requires not only an accurate count of the product facings actually seen on the shelf (Actual Facing Counts or AFCs) but also an accurate count of product facings that are expected to be seen (Expected Facing Counts or EFCs). A single observation of a retail shelf results in an AFC List of actual facing counts for each distinct product (SKU) found at that moment in time. Similarly, an EFC List is required to be able to compare actual counts to what is expected to be there.

Computing these metrics for a given retail shelf area requires collection of data about each distinct product on the shelf area periodically over a period of time. An example of such raw shelf data includes the Actual Facing Counts (AFC) of each distinct product. CPG products are generally identified by a unique number with up to 14 digits. In the United States, these numbers are known as Universal Product Codes (UPC). Internationally, these numbers are known as Global Trade Item Numbers (GTIN). In both cases, the numbers are managed and assigned by a neutral, not-for-profit, global organization called GS1. Throughout the rest of this document, we will refer to these unique identifying numbers as GTIN.

Although the GTIN of a product provides a compact, unique identity for every consumer product sold anywhere in the world, there is a variable list of metadata that may also be used to identify the products. These include, but are not limited to, product name, packaging type, product size, brand and variety.

The GTIN for a product is almost always printed onto the label of CPGs, usually in the form of a machine-readable barcode. This barcode is often read by the scanner at the point of sale. Unfortunately, the barcodes are usually printed on the back of the product label/packaging, so they are not visible to a human or automated shelf scanner without actually touching the product. Adding a new or changed product to an automated shelf data collection system thus involves a manual process to scan the barcode and ingest each new product into the system.

Some advanced machine learning approaches to CPG classification from image data use an approach that can be characterized as a "compare and contrast strategy." Within the training regime, the models learn in a manner similar to the way human children learn to classify or name things. When a child first encounters a new object or animal, say a zebra, they do not begin afresh by identifying all the features and characteristics of the zebra (four legs, mane, tail, long face, etc.) that qualify its existence in the class of all zebras. Instead, they generally compare it to something else they already know how to identify and remember just the differences between the two classes. For example, a zebra is like a horse with stripes. This is a much more efficient way to learn new classes and to encode those classes within neural networks, both biological and artificial. The strategy involves just two activities when learning a new class: (1) compare the new thing with all the other things one already knows to identify a small set of semantically similar objects, and (2) contrast the new thing with one or two of the similar objects, remembering only the differences between them.

Automated in-store inventory solutions based on deep learning techniques also require training and continuous refinement of their trained datasets as product packaging changes, new products are added, and brands are bought and sold by multi-national CPG companies. A single large grocery store might display as many as 100,000 distinct products, and there are millions of distinct CPGs throughout the world. Such systems currently require that each and every product be manually ingested and its barcode scanned by someone who physically touches it before any shelf data or training data can be collected and processed.

Techniques and methods are required to reduce the expense and time criticality of product ingest procedures for new or changed CPGs and facilitate low-touch or no-touch product ingest in automated in-store inventory systems. In addition, it is desired to be able to begin collecting shelf data and training data for new products and associating such data with the correct product, even before the system has completely identified the GTIN of the product being examined.

SUMMARY OF THE DISCLOSURE

Figure 1:
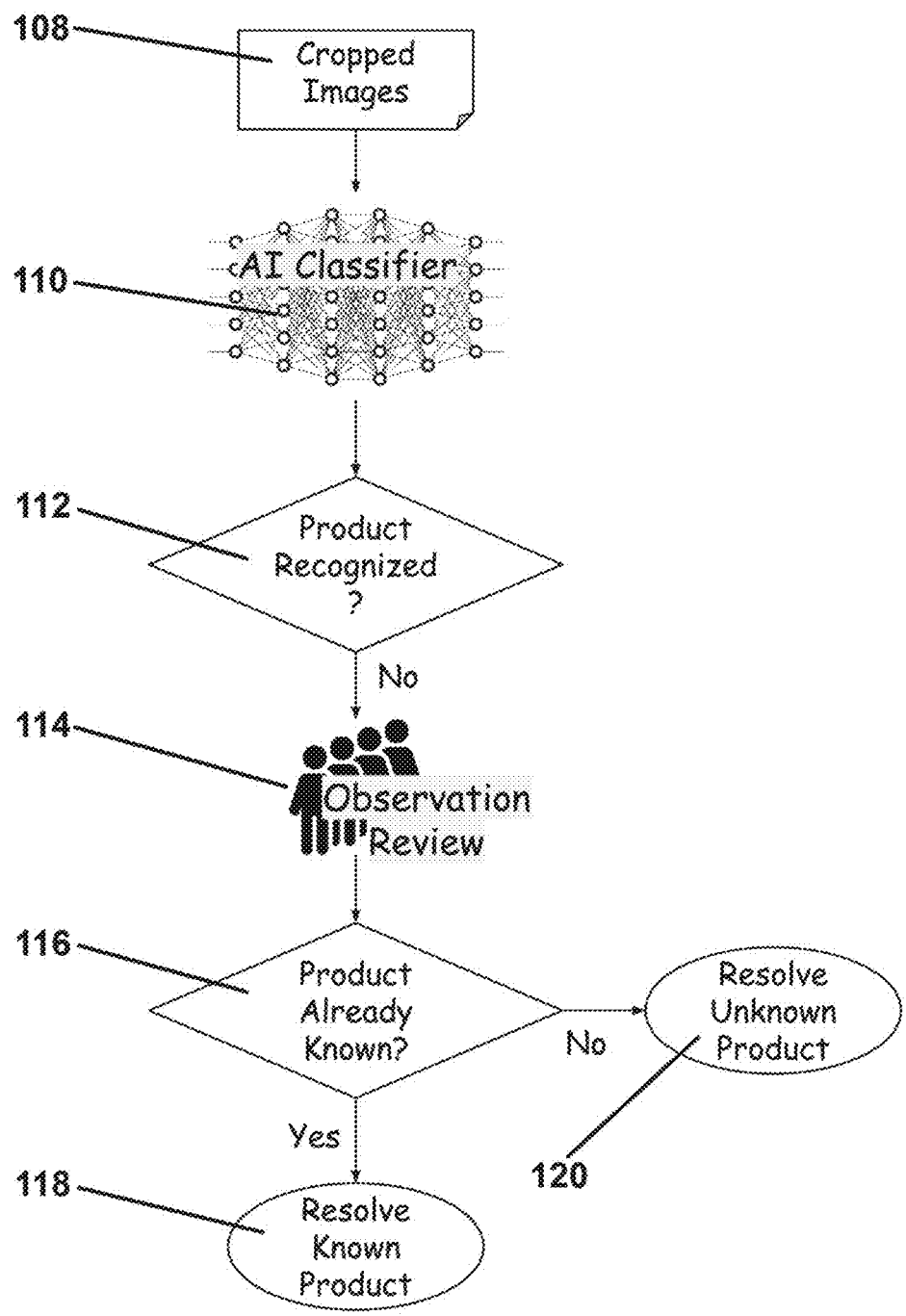
FIG. 1 is a flowchart depicting the partial product workflow for an embodiment of a data collection system of the type disclosed herein.

In one aspect, a method is provided for identifying consumer packaged goods (CPGs). The method comprises providing to a machine learning classifier a set of images containing at least one CPG; receiving from the machine learning classifier an indication that the machine learning classifier cannot reliably identify a designated CPG in the set of images; determining whether the designated CPG is a product in a product catalog; if the designated CPG is in the product catalog, then associating the designated CPG with a Global Trade Item Number (GTIN); and if the designated product is not in the product catalog, then designating the CPG as a potentially new product.

In another aspect, a method is provided for identifying consumer packaged goods (CPGs). The method comprises providing to a machine learning classifier a set of images containing at least one CPG; if the machine learning classifier determines the identity of a CPG represented in the set of images, then deriving insights and key performance indicators (KPIs) from the determined identity; if the machine learning classifier cannot determine the identity of a CPG represented in the set of images, then sending to a human review team an indication that the machine learning classifier cannot determine the identity of the CPG represented in the set of images; determining whether the designated CPG is a product in a product catalog; if the designated CPG is in the product catalog, then associating the designated CPG with a Global Trade Item Number (GTIN); and if the designated product is not in the product catalog, then designating the CPG as a potentially new product.

In a further aspect, a method for identifying consumer packaged goods (CPGs) is provided. The method comprises (a) training a machine learning classifier on a training dataset that includes at least one image of a CPG, thereby obtaining a trained machine learning classifier; (b) providing to the trained machine learning classifier a set of images containing at least one CPG; (c) receiving from the trained machine learning classifier a proposed identity for the CPG; (d) determining that the proposed identity for the CPG is incorrect; (e) providing a corrected classification for the CPG; (f) adding the set of images and the corrected classification to the training dataset; and (g) using the training dataset in a further iteration of steps (a)-(c).

In still another aspect, a method is provided for identifying consumer packaged goods (CPGs). The method comprises providing to a machine learning classifier a set of input images containing a CPG, wherein the machine learning classifier identifies CPGs by comparing the set of input images to images in a product catalog; receiving from the machine learning classifier an indication that the CPG is not in the product catalog; collecting information about the CPG; using the collected information to create a partial product description; adding the partial product description to a list of partial products; and adding the partial product description to the product catalog.

DETAILED DESCRIPTION

Systems and methodologies are disclosed herein for selecting unidentified products that have not yet been ingested into the system from photographs or videos of retail shelves, and for flagging those unidentified products for human auditors to examine. Advanced deep learning CPG classification systems like the ones described above present a number of important advantages and may be implemented in the systems and methodologies disclosed herein. These systems and methodologies may identify individual images of new CPGs it has not seen before and flag those images for human auditors to review. Subsequent images of the same new CPG may be associated together, even if the system does not yet know how to label the new CPG (that is, if the GTIN of the CPG is unknown). Shelf data (such as actual facing counts) and training images may be collected for the new CPG prior to its ingest. Training images of the new CPG may be used to improve the accuracy of the system in identifying the CPG, even before it knows precisely what it is.

The systems and methodologies disclosed herein encompass a novel approach that exploits these advantages of deep learning classifiers with AI-assisted human audit procedures to allow partially-identified products to be examined and completed while continuing to collect observations and data for them.

Referring now to the drawings in which like reference designators refer to like elements, there is shown in FIG. 1 an overall flow diagram of the process used to identify, utilize, and resolve partially-identified products (referred to henceforth as partial products). A deep-learning or other machine learning classifier 110 is first presented with a set of cropped images 108 containing pictures of Consumer Packaged Goods. If the AI classifier is able to determine with high confidence the identity (including its assigned GTIN) of the CPG represented in a cropped image 112, the observation is submitted to the remainder of the processing pipeline to derive insights and Key Performance Indicators. If, however, the AI classifier cannot reliably identify the product in the cropped image, it is submitted to an observation review team of human reviewers 114 for further action. If the human reviewer determines 116 that the cropped image is of a product already known to the system (that is, the product is in a product catalog known to the system), it is passed along to a sub-process in which the incorrect observation is corrected to refer to the GTIN of the correct product 118. If the observation review team determines the observation is possibly a new product, it is passed to a sub-system 120 that further examines the image to find further information about it.

Still referring to FIG. 1, these are some possible embodiments of the various steps and processes in that flow chart. These embodiments of the present invention are illustrative, and are not intended to be limiting.

In some embodiments of the systems and methodologies described herein, the AI Classifier 110 is a deep learning artificial neural network model trained to recognize CPGs from their cropped images.

In some embodiments of the systems and methodologies described herein, the decision 112 whether the AI Classifier has successfully recognized a known product is based on a confidence score provided by the classifier.

In some embodiments of the systems and methodologies described herein, the Observation Review task 114 generated by the system includes one or more images of alternative products that are similar to the unidentified one. These alternatives may be chosen to be the top few known products with highest confidence scores that are, nonetheless, below the confidence threshold for product identification.

In some embodiments of the systems and methodologies described herein, the Observation review task 114 generated by the system includes location information about where the product was observed. The location information can include store, aisle, shelf, and position. This information can be used later in the process to find and fully ingest the product information.

In some embodiments of the systems and methodologies described herein, the decision about whether an observation represents a known product 116 includes both fully ingested and partial products. In this way, multiple observations of the same unknown product can be coalesced into a single partial product record.

Figure 2:
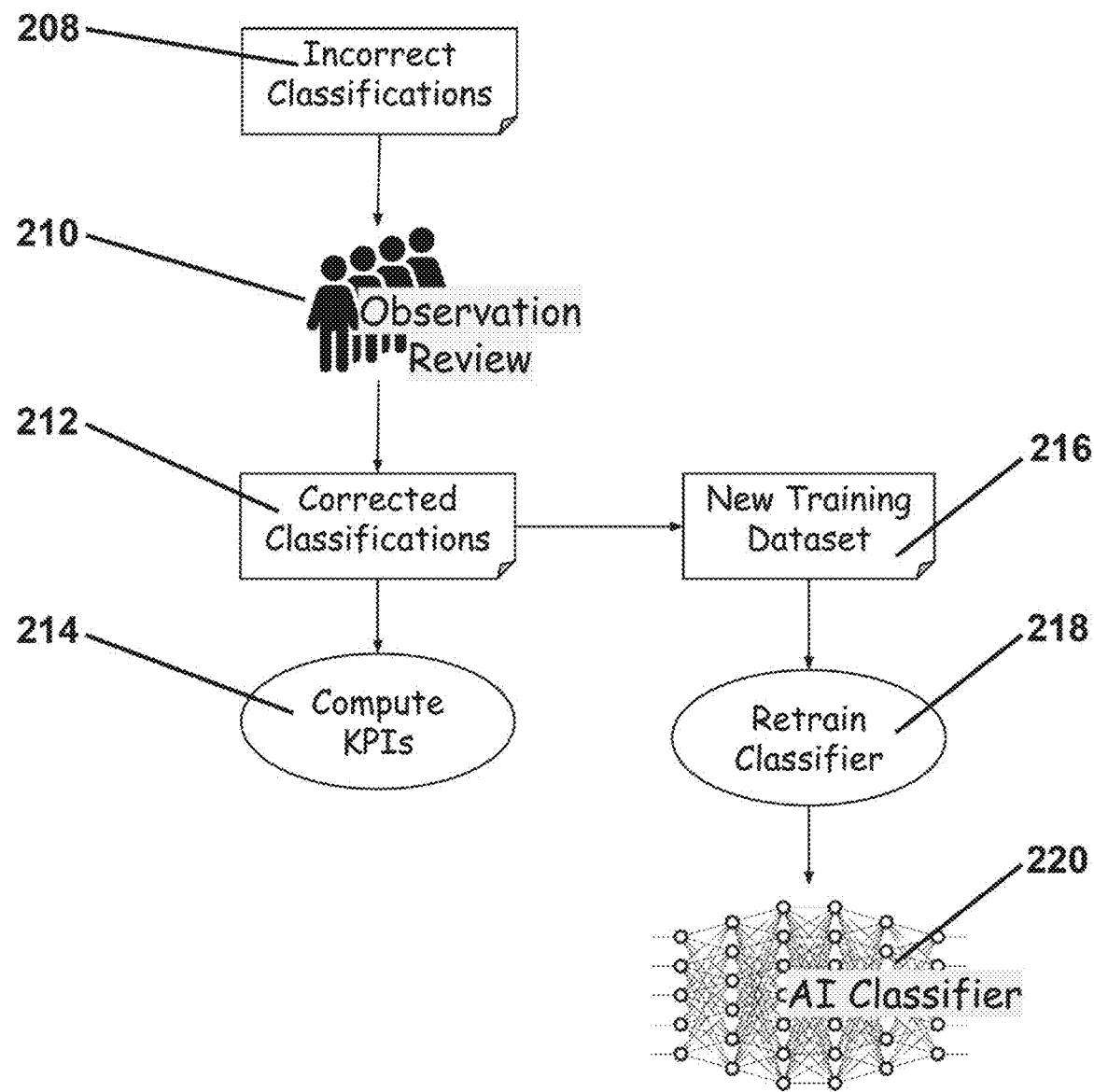
FIG. 2 is a flowchart depicting the workflow for a known product resolution in an embodiment of a data collection system of the type disclosed herein.

The purpose of the Known Product Resolution sub-process diagrammed in FIG. 2 is to take the incorrect classification 208 produced by the classifier and allow the observation review team 210 to properly classify it 212 and pass it along to the rest of the system 214 for further processing. In addition, the cropped image that produced the incorrect classification can also be added to a training dataset 216 that will later be used to retrain 218 the classifier learning model 220, thus improving future classification accuracy and reducing the chances of another faulty product classification.

In some embodiments of the systems and methodologies described herein, the corrected known product classifications 212 may include existing partial products as well as fully-ingested products. In some embodiments of the systems and methodologies described herein, images of the corrected known products added to the new training dataset 216 may include additional images of existing partial products. In this way, the AI classifier is continuously retrained to improve its ability to correctly identify partial products, even before they are fully ingested and their GTINs become known to the system.

Figure 3:
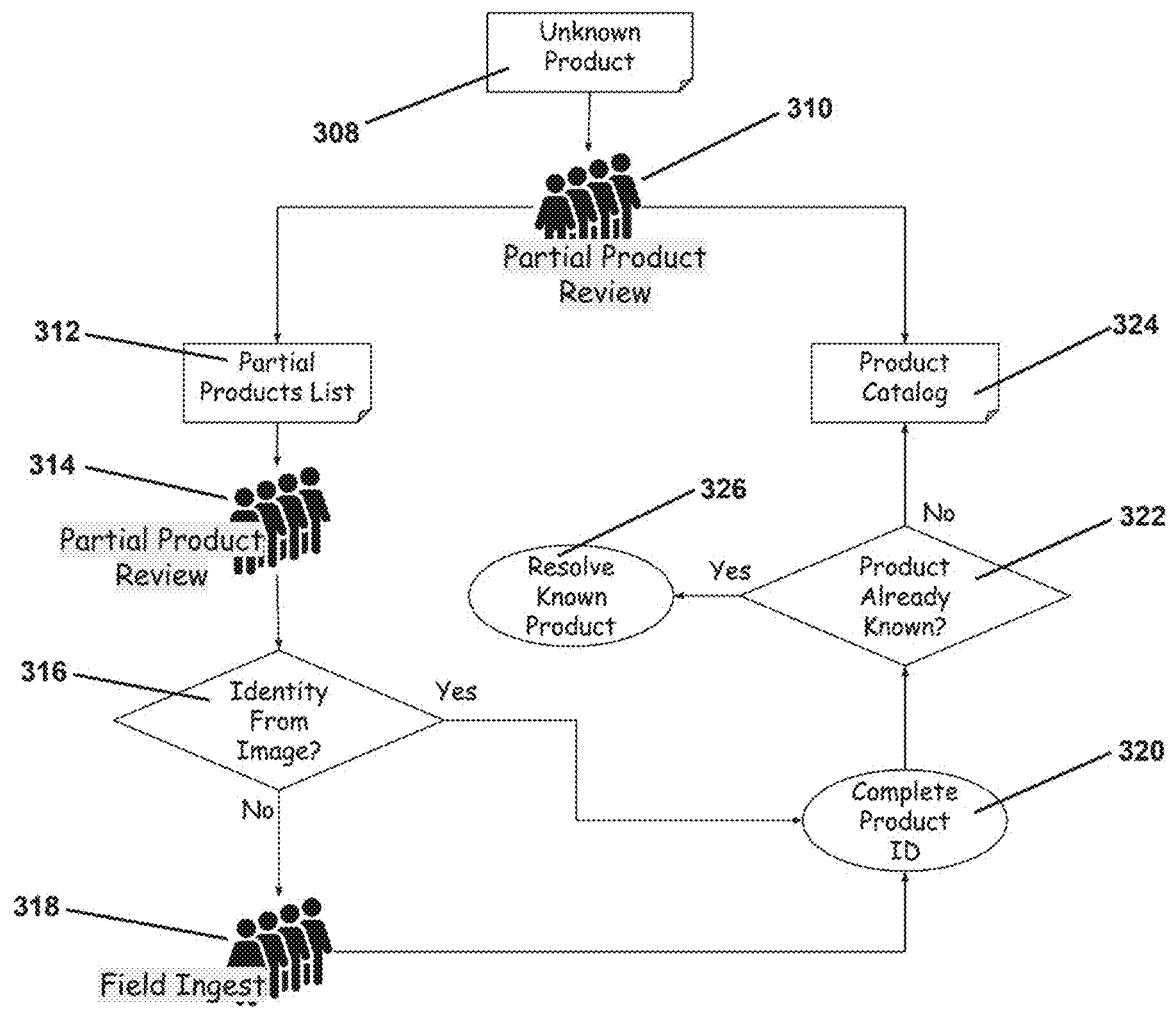
FIG. 3 is a flowchart depicting the workflow for an unknown product resolution in an embodiment of a data collection system of the type disclosed herein.

In FIG. 3, there is shown a sub-process for handling observations 308 that have been determined to refer to products that are not yet reflected in the system's product catalog. First, the unknown product observation is submitted to a Partial Product Review team of humans 310 who examine the cropped image to obtain as much information about the unknown product as possible. A particular, non-limiting, embodiment of this step would involve the collection of information such as product name, size, brand, product category, and other such metadata that are typically visible from a front view of the product on a retail shelf. The product review team 310 creates a new partial product and annotates it with all the non-GTIN metadata that can be collected from the image, and then adds the newly-created partial product to a list of partial products 312. At the same time, the partial product is added to the system's product catalog 324, thus allowing it to be treated as a full-fledged product until it can be fully identified by its unique GTIN. Thus, the system may continue to collect data about the new product even before it knows exactly what it is. If the GTIN is identified 316 by human Partial Product Reviewers 314, they will complete the partial product definition by adding the GTIN, thus completing the new product ingest of that CPG. In most cases, however, the product's barcode on which the GTIN is printed will not be visible in the in situ cropped image, as it is usually printed on the back side of the product label. To handle that case, the list of partial products is subdivided by location and assigned to in-store or field employees 318 to complete the ingest process 320. As a last resort, if all other means of product identification fail, someone will visit the retail store in which the partial product was found and visually scan the barcode to determine its GTIN and complete its identification. Once this is done, one last check is made 322 to determine if the identified product already exists in the product catalog. This is necessary because packaging design for a given product often changes for branding or seasonal purposes, thereby necessitating a retraining of the AI classifier for that product. Therefore, if the partial product is ultimately found to have the same GTIN as an existing product, even if the visual appearance is completely different, it will be submitted 324 to the same Known Product Resolution sub-process as described above in FIG. 2. Finally, if the GTIN of the newly identified product is indeed a new GTIN not previously known to the system, it is added 324 to the product catalog.

In some embodiments of the systems and methodologies described herein, the decision whether a GTIN can be determined solely from the cropped in situ image of an unknown product 316 may be based on an exact match of one or more pieces of product metadata visible on the product image. For example, if the product name, brand, size, and variety are all discernable and match an existing product, the human Partial Product Reviewer could decide to use the GTIN of the matched product to complete the partial product identification in completion of the ingest process 320.

In some embodiments of the systems and methodologies described herein, the full identity of a partial product 316 may be discernible from online sources of GTIN information. In such cases, no-touch ingest of a new product will be possible.

In some embodiments of the systems and methodologies described herein, the Field Ingest Team 318 is provided with specific location information about the observation(s) that generated the partial product. In this way, ingest tasks for partial products may be efficiently assigned to in-store personnel.

In some embodiments of the systems and methodologies described herein, the decision whether a product is already known 322 may be determined solely by the barcode after a physical examination of one or more instances of the partial product. This may happen, for example, if a product's packaging is substantially changed or redesigned, perhaps for reasons of brand refresh or seasonal promotions. In those cases, there might be few visual indications that the partial product is, in fact, a new package for an existing product.

As used herein, the term "image capturing device" or "imaging device" includes any device that may be used to capture an image of a CPG. Specific, nonlimiting examples include digital cameras adapted to capture digital images or video of CPGs. Such devices will typically include at least one lens, a digital sensor, one or more filters, a shutter, an aperture, and control electronics. In some applications of the methodologies disclosed herein, such an image capture device or imaging device may be mounted on, or incorporated into, a drone, a robot, or a vehicle.

In some embodiments, the various methods described herein through the use of one or more computational devices equipped with at least one tangible memory device and at least one processor. In such embodiments, the at least one tangible memory device may have suitable programming instructions recorded therein which, when performed by the at least one processor, perform one or more (and possibly all) of the steps of the method. The computational device may be in communication with the imaging device through, for example, various wired or wireless means which may involve the use of one or more communications networks.

Certain aspects or features of the systems and methodologies disclosed herein may be described in, or further appreciated in light of, U.S. Pat. No. 10,885,395 (Iventosch et al.), entitled "Method for scaling fine-grained object recognition of consumer packaged goods"; U.S. Pat. No. 11,314,992 (Iventosch et al.), entitled "System for scaling fine-grained object recognition of consumer packaged goods"; U.S. Ser. No. 17/709,190 (Iventosch et al.), entitled "System For Detecting And Classifying Consumer Packaged Goods"; U.S. Ser. No. 17/849,341 (Iventosch et al.), entitled "Method For Scaling Fine-Grained Object Recognition Of Consumer Packaged Goods"; U.S. Ser. No. 17/840,586, entitled "AI-Assisted Human Data Augmentation And Continuous Training For Machine Learning Models"; and U.S. Ser. No. 18/081,664 (Dutton et al.), entitled "Method For Learning Restock Patterns From Repeated Observations Of Shelf Facing Counts Of Consumer Packaged Goods"; all of which are incorporated herein by reference in their entirety.

The above description of the present invention is illustrative and is not intended to be limiting. It will thus be appreciated that various additions, substitutions and modifications may be made to the above described embodiments without departing from the scope of the present invention. Accordingly, the scope of the present invention should be construed in reference to the appended claims. It will also be appreciated that the various features set forth in the claims may be presented in various combinations and sub-combinations in future claims without departing from the scope of the invention. In particular, the present disclosure expressly contemplates any such combination or sub-combination that is not known to the prior art, as if such combinations or sub-combinations were expressly written out.

What is claimed is:

1. A method for identifying consumer packaged goods (CPGs), comprising:
    providing to a machine learning classifier a set of images containing at least one CPG;
    receiving from the machine learning classifier an indication that the machine learning classifier cannot reliably identify a designated CPG in the set of images;
    determining whether the designated CPG is a product in a product catalog;
    if the designated CPG is in the product catalog, then associating the designated CPG with a Global Trade Item Number (GTIN); and
    if the designated product is not in the product catalog, then designating the CPG as a potentially new product.

2. The method of claim 1, wherein said set of images containing CPGs is a set of cropped images.

3. The method of claim 2, wherein said machine learning classifier is an artificial intelligence (AI) classifier.

4. The method of claim 3, wherein said AI classifier is a deep learning artificial neural network model trained to recognize CPGs from their cropped images.

5. The method of claim 1, wherein receiving from the machine learning classifier an indication that the machine learning classifier cannot reliably identify a designated CPG in the set of images is based on a confidence score implemented by the classifier.

6. The method of claim 1, wherein the machine learning classifier is a deep learning artificial neural network model.

7. The method of claim 6, wherein the deep learning artificial neural network is trained to recognize CPGs from their cropped images.

8. The method of claim 1, wherein the determination that the machine learning classifier cannot reliably identify a designated CPG in the set of images is based on a confidence score provided by the machine learning classifier.

9. The method of claim 1, further comprising:
    if an indication is received from the machine learning classifier that the machine learning classifier cannot reliably identify a designated CPG in the set of images, then submitting the set of images containing the CPG to a human review team.

10. The method of claim 9, wherein the set of images containing the CPG includes at least one image of at least one alternate product that is similar to the product that the machine learning classifier cannot reliably identify.

11. The method of claim 9, wherein the determination that the machine learning classifier cannot reliably identify a designated CPG in the set of images is based on a confidence score provided by the machine learning classifier being below a predetermined threshold value, and wherein the set of images containing the CPG includes a plurality of images of a plurality of products with highest confidence scores that are below said predetermined threshold value.

12. The method of claim 9, wherein submitting the set of images containing the CPG to a human review team further includes submitting location information to the human review team, and wherein the location information includes location information about where the product was observed.

13. The method of claim 12, wherein the location information includes information about the location the product was observed in, and wherein the location information is selected from the group consisting of the store, aisle, shelf, and position the product was observed in.

14. The method of claim 1, wherein providing to a machine learning classifier a set of images containing at least one CPG includes:
    capturing, with an image capturing device, a set of images of at least one tangible CPG disposed on a physical shelving unit.

15. The method of claim 14, further comprising:
    cropping each member of the set of images.

16. The method of claim 14, wherein the image capture device is a digital camera.

17. The method of claim 14, wherein the image capture device is a drone.

18. The method of claim 14, wherein the image capture device is a robot.

19. A method for identifying consumer packaged goods (CPGs), comprising:
    providing to a machine learning classifier a set of images containing at least one CPG;
    if the machine learning classifier determines the identity of a CPG represented in the set of images, then deriving insights and key performance indicators (KPIs) from the determined identity;
    if the machine learning classifier cannot determine the identity of a CPG represented in the set of images, then sending to a human review team an indication that the machine learning classifier cannot determine the identity of the CPG represented in the set of images;
    determining whether the designated CPG is a product in a product catalog;
    if the designated CPG is in the product catalog, then associating the designated CPG with a Global Trade Item Number (GTIN); and
    if the designated product is not in the product catalog, then designating the CPG as a potentially new product.

20. The method of claim 19, wherein the steps of (a) determining whether the designated CPG is a product in a product catalog, (b) associating the designated CPG with a GTIN, and (c) designating the CPG as a potentially new product are performed by the human review team.

* * * * *